J. P. WALTER.
SHOVEL.
APPLICATION FILED MAY 23, 1919.

1,438,881.

Patented Dec. 12, 1922.
6 SHEETS—SHEET 1.

Witnesses
Edwin F. McKee

Inventor
John P. Walter
By Victor J. Evans
Attorney

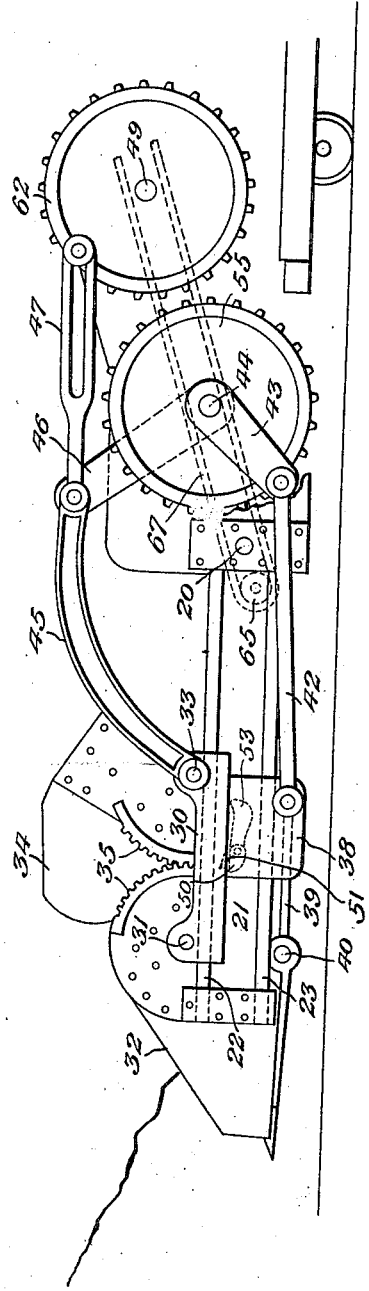

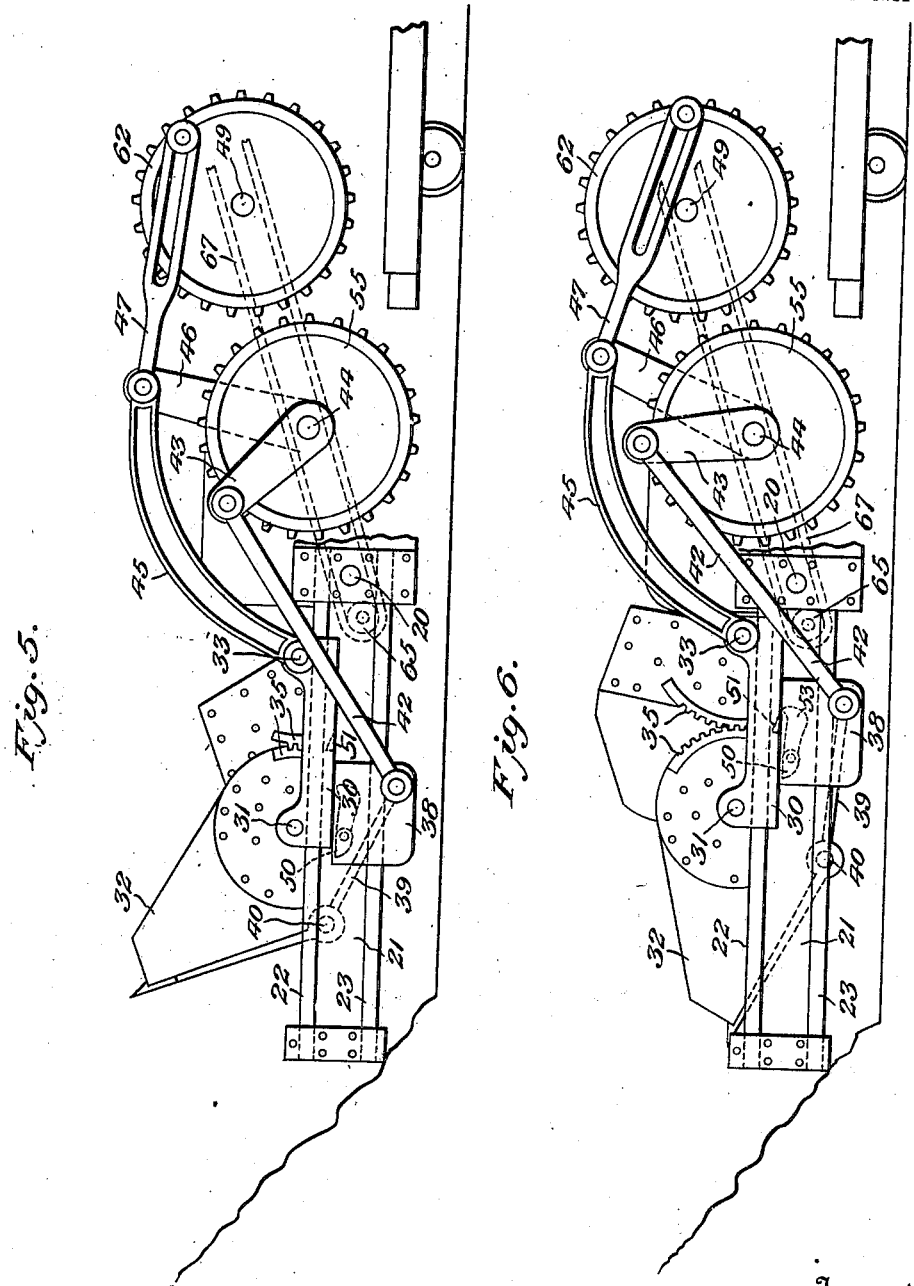

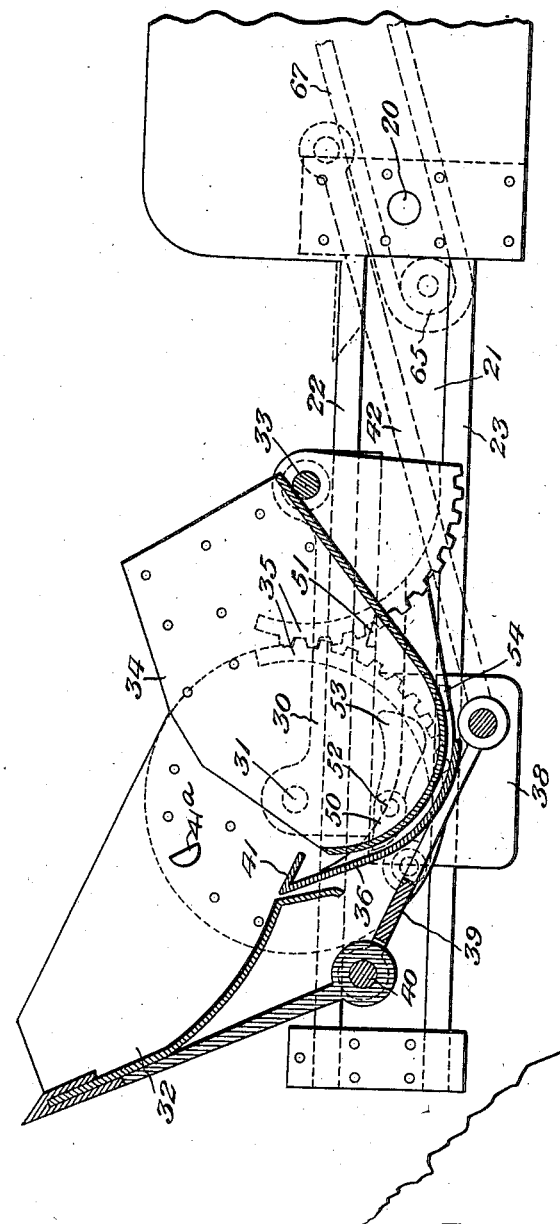

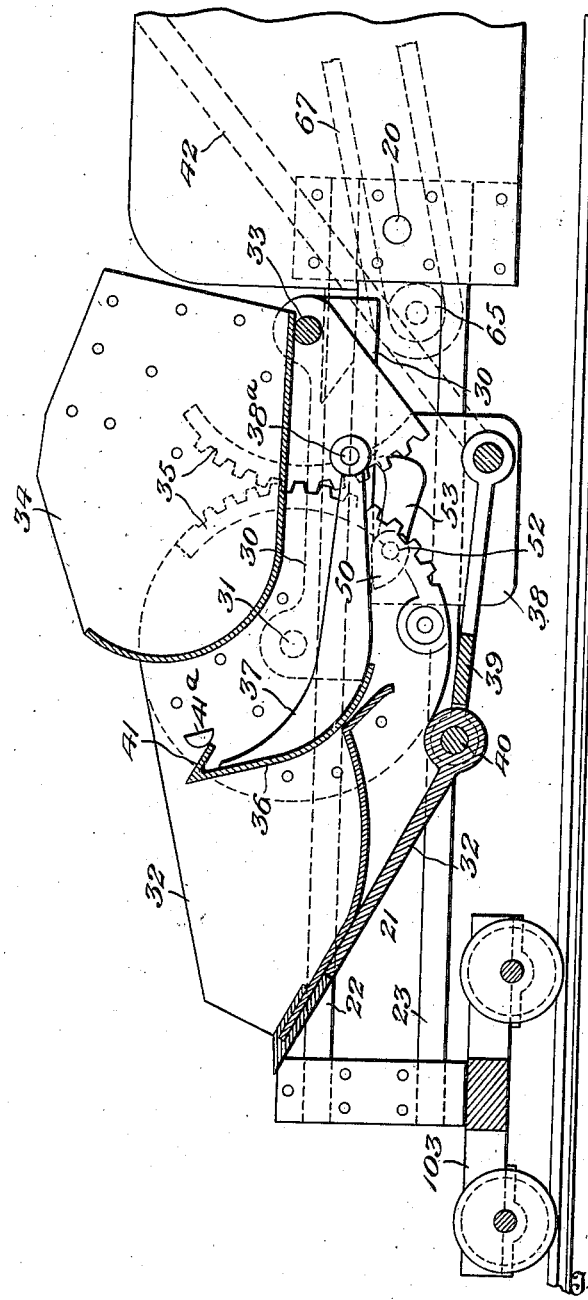

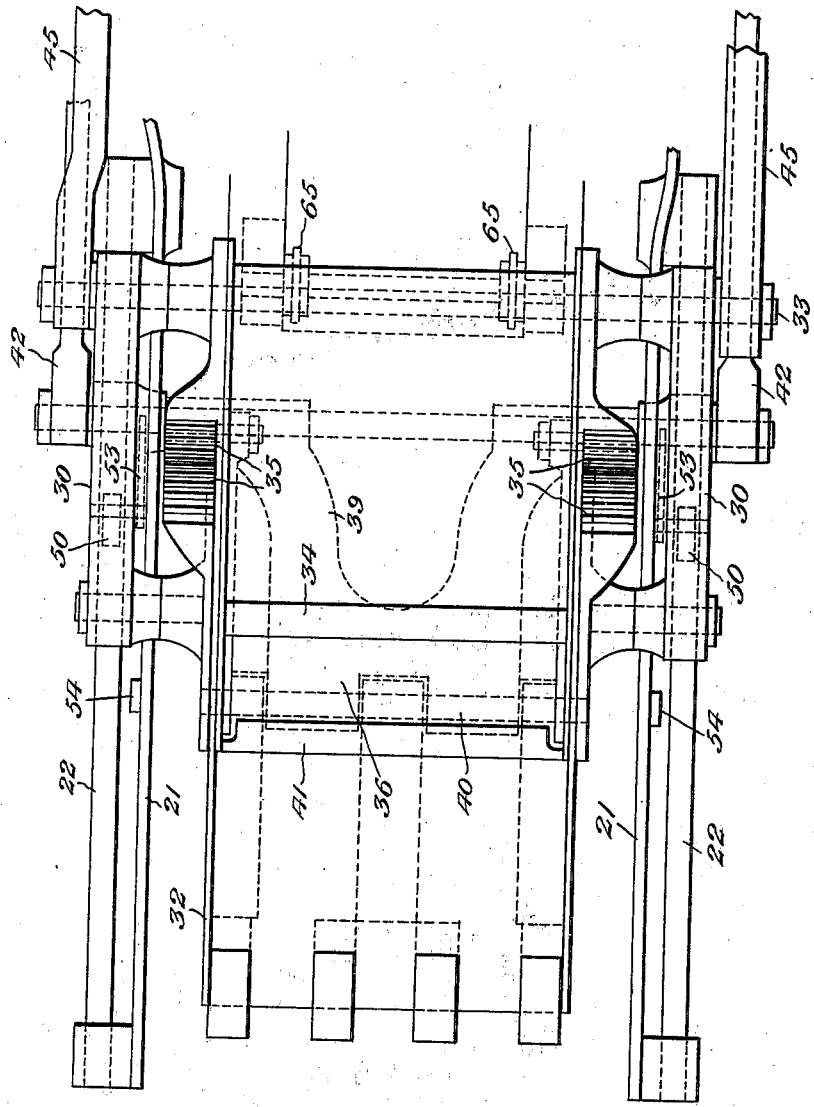

Patented Dec. 12, 1922.

1,438,881

UNITED STATES PATENT OFFICE.

JOHN P. WALTER, OF ALLENTOWN, PENNSYLVANIA.

SHOVEL.

Application filed May 23, 1919. Serial No. 299,116.

*To all whom it may concern:*

Be it known that I, JOHN P. WALTER, a citizen of the United States, residing at Allentown, in the county of Lehigh and State of Pennsylvania, have invented new and useful Improvements in Shovels, of which the following is a specification.

This invention relates to shovels, the object being to provide a shovel which is combined with a conveyor or loading mechanism for use in mines.

The principal object of the invention is to provide a shovel for use in restricted areas, the shovel being constructed so as to dump its load rearwardly upon a conveyor, to be conveyed to the cars of carts.

Another object of the invention is to provide a machine of the above character which may be successfully used in low places, such as in the mining of bituminous coal which is usually mined by being undercut by mining machines.

Another object is to provide a machine which may be turned horizontally at various angles to permit of a change of position of the shovel without moving the machine proper.

A further object of the invention is to provide a machine which in addition to including all of the above and many other advantages, will materially reduce the cost of production, the use of the machine being possible in places whose small area prohibits the use of machines of the usual character.

Various other objects and advantages of the invention will appear as the following description is read in connection with the accompanying drawings.

In the drawings:

Figure 3 is an enlarged view of the forward end of the shovel, the parts being at the limit of their forward movement.

Figure 4 shows the position of the parts in the act of unloading the shovel into the transfer pan, the parts being in their initial unloading position.

Figure 5 shows the shovel at the finish of its unloading position.

Figure 6 is a view similar to Figure 5, with the parts in position occupied just prior to the unloading of the transfer pan.

Figure 7 is an enlarged detail sectional view of the forward end of the machine, with the parts in the position assumed just after the unloading of the shovel into the transfer pan.

Figure 8 is a view similar to Figure 7 showing the position of the parts as the transfer pan is unloading upon the conveyor.

Figure 9 is a skeleton view illustrating the frame of the machine, the pivoted boom and associated parts, certain parts being omitted.

Figure 1:
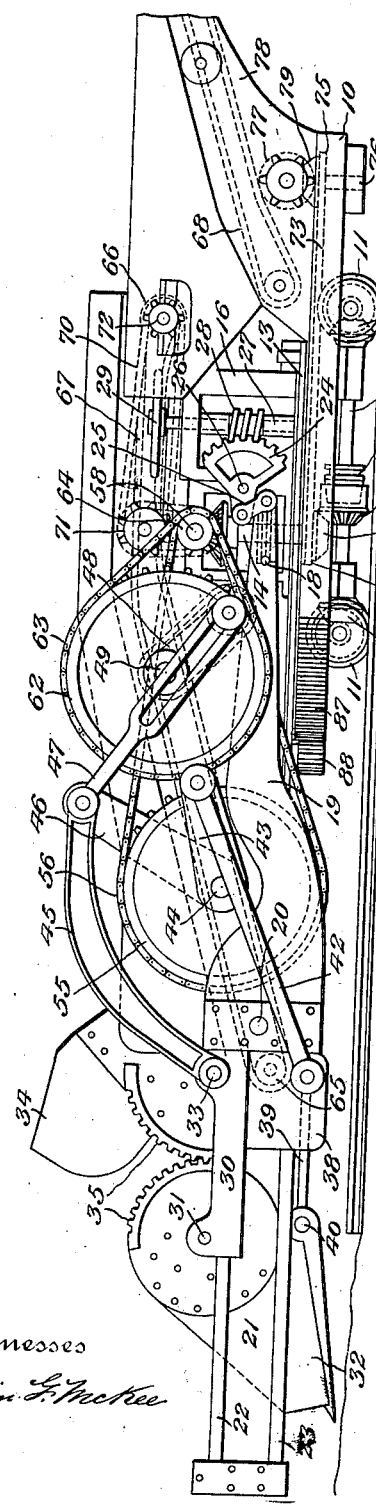
Figure 1 is a side elevation of a shovel embodying the present invention.

Referring to the drawings in detail, wherein like characters of reference denote corresponding parts, the numeral 10 indicates a truck, which is mounted upon traction wheels 11, suitably journaled upon the truck and which are designed to operate over a track 12.

Mounted upon the truck is a turn-table 13, the latter being rotated upon a vertically disposed shaft 14, and supported upon wheels or rollers 15, travelling over the truck platform.

The truck 10 carries a suitable supporting frame 16, upon which is mounted a motor 17, electrically or otherwise operated from a suitable source of power (not shown). Also mounted above the truck 10 upon antifriction bearings 18 are arms 19, the latter having pivotally mounted at their outer ends upon a shaft 20, a boom. This boom is formed of a pair of arms 21, arranged upon each side of the arms 19, the former having rigidly secured thereto spaced upper and lower guide rods 22 and 23, the latter being also spaced outwardly from the arms 21. The inner ends of each of the arms 21 are connected to a toothed segment 24 through the medium of a link 25, the segment being mounted for pivotal movement, as shown at 26. A vertically disposed shaft 27 has secured thereon a worm 28, which is operated by a hand wheel 29. It will be apparent that by rotating the worm 28, the segment 24 will be moved upon the pivot 26 and through the link connection 25, the arms 21 of the boom will be swung upon the shaft 20, so that the outer ends of the said arms may be raised or lowered, as desired.

Mounted for sliding movement upon the guide rod 22, is a cross head 30, one end of which has pivotally mounted thereon, as shown at 31, a shovel or dipper 32. The opposite end of the cross head 30 has pivotally mounted thereon, as shown at 33, a pan 34, the pan and dipper being connected so as to provide for simultaneous pivotal movement through the medium of segmental gears 35. The inner rear end of the dipper 32 is open and when the said dipper is in loading position, is adapted to be closed by a gate 36. This gate has secured to each side edge, an arm 37, one end of which is pivoted upon a stud 38ª mounted upon the segment 35, secured to the pan 34.

Figure 2:
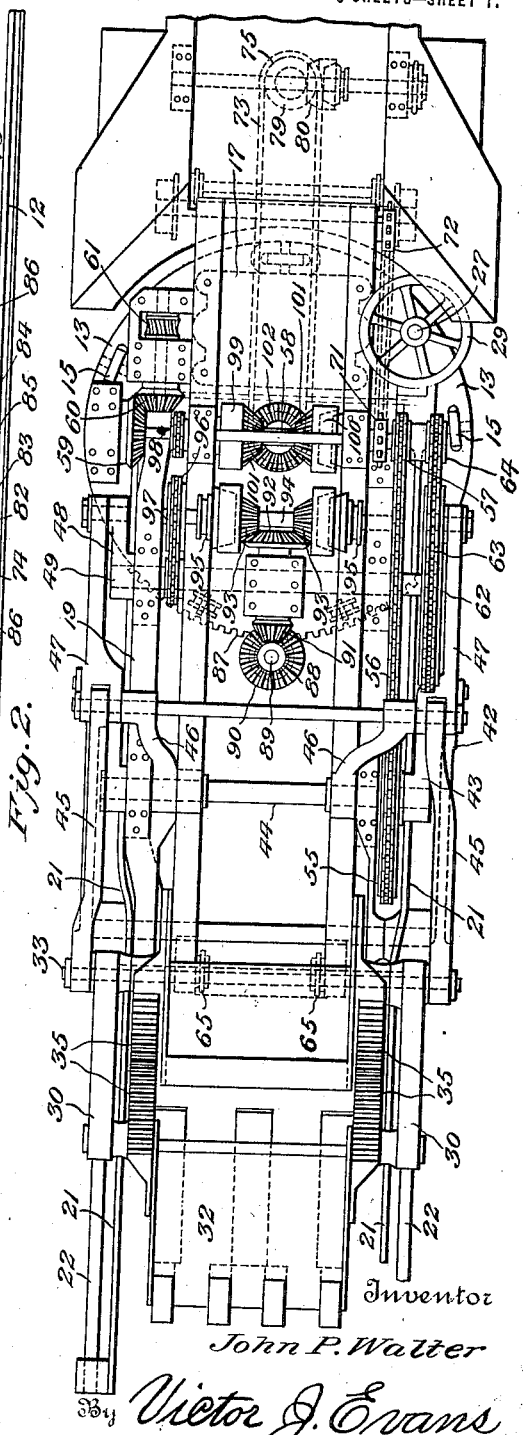
Figure 2 is a top plan view of the same.

Slidably mounted upon each of the guide rods 23, is a slide 38, the latter having pivoted thereto one end of a link 39, the opposite end of this link being in turn pivotally connected, as shown at 40, to the shovel or dipper 32. A movement of the slides 38 will, therefore, through the medium of the links 39, rock the shovel or dipper 32 upon the pivots 31, and through the medium of the segmental gears 35 rock the pan 34 in a direction reverse to that of the shovel or dipper. The parts are so arranged that when the dipper is in its lower or loading position, as shown in Figures 1 and 2, the gate 36 will occupy a position to provide a back for the dipper and prevent the load from being shoved to the rear end. When the dipper is elevated by a movement of the slides 38, the gate 36 will be lowered to the position shown in Figure 7, so as to permit of the contents of the dipper being dumped or unloaded into the receiving pan 34, which has been moved to a lowered or receiving position through the action of the segmental gears 35. The gate 36 is provided with a flange 41 to deflect the contents of the dipper, causing the said contents to pass from the said dipper to the receiving pan without entering the space between the said dipper and pan. When the dipper is in the position shown in Figs. 1 and 2, the gate 36 is held in closed position through the engagement of its flange 41 with a lug 41ª carried by the dipper, but as the latter is elevated this lug disengages and permits the gate to lower.

Pivotally secured to each of the slides 38, is a pitman 42, one end of this pitman being pivotally connected to an arm 43, secured upon a transverse shaft 44.

Pivotally connected to each side of the cross head 30, is one end of a curved link 45, the opposite ends of these links being connected to one end of arms 46, rotatable upon the shaft 44 at each side of the machine. A link 47, which has one end pivotally secured to the arms 45 and 46, has its opposite ends pivotally and slidably connected to cranks 48, the latter in turn being mounted upon a transverse shaft 49.

Pivotally mounted upon each of the slides 38, is a dog 50, the latter being adapted to engage ratchet 51 provided in the cross head 30. The dog 50 is fast upon its pivot which is engaged at 52 and also fast upon the pivot 52, is an arm 53, which is adapted to engage a lug 54, mounted upon each of the arms 21 and located in the path of movement of the said arm to disengage the latter from the ratchet 51, during the forward sliding movement of the cross head.

The function of the dog 50 with its lever 53 and ratchet 51, is to keep the two slides in their proper relative positions during the forward movement of the dipper 32 and to hold said dipper rigidly in place in the event it encounters solid substances, or in the event that the bottom should be uneven and raised higher than the lip of the dipper. When the dipper reaches its proper forward position, the lever 53 engages with the lug 54 and disengages the dog from the ratchet and permits the loaded dipper to be elevated to a dumping position.

In the operation as thus far described, the dipper and pan will be moved forwardly in a horizontal direction for the purpose of loading the former. During this movement which is accomplished through the medium of the rotation of the shaft 44, the dog 50 will be engaged with the ratchet 51, so that the slides 38 will be locked to the cross head 30 to carry the dipper and pan forward in a manner to prevent movement of the said dipper and pan upon their pivots. Owing to the slotted connection between the links 47 and the arms 48, no forward movement will be imparted to the cross head 30 through the arms 45. When the cross head 30 reaches the limit of its forward movement, the arms 53 will engage the lugs 54, releasing the dog 50 from the ratchet 51, and thereby disconnecting the slides from the cross head. The continued rotary movement of the shaft 44 will move the slides rearwardly along the guides at the same time the cross head is moved in a rearward direction, due to the pivotal connection between the arms 48 and the links 47 having reached the outer ends of the slides in the said arms. This will impart a rotary movement to the segmental gears 35, whereupon the shovel or dipper will be elevated and the transfer pan lowered, due to the differences in the speed of travel of the head and slide, the pan then receiving the load from the dipper. A further movement of the shaft 44 will reverse the direction of travel of the segmental gears 35 due to the reverse movement of the slide and cross head to elevate the pan 34, which has then reached its limit of rearward movement, causing the said pan to unload its contents upon a conveyor, to be hereinafter described.

Mounted upon the shaft 44, is a sprocket 55, which is connected through the medium of a chain 56, with a sprocket 57 in turn mounted upon a drive shaft 58. This shaft has mounted thereon a beveled gear 59, which is operated by a gear 60, driven from a worm gear 61, operated by the motor 17. Mounted upon the shaft 49, is a sprocket 62, which is also driven through the medium of a chain 63, from a sprocket 64, fast upon the shaft 58. Motion is thus imparted to the shafts 44 and 49, for the purpose of operating the dipper and transfer pan in the manner just described.

The action of the cross heads, slides, dipper and transfer pan may be described as follows. The sprockets 62 and 55 are actuated by sprocket chains operating over sprockets of equal pitch on the shaft 58, all of said sprockets operating at the same speed. Sprockets 62 and 55 are so connected to the cross heads 30 and 38 that the former travels a less distance at each stroke. The sprockets 62 and 55 operate in a clockwise direction at the same speed, so that the proper relative positions of the cross heads 30 and 38 are always maintained. In Figure 1, the transfer pan is illustrated in fully dumping position, that is, it is discharging the material on the conveyor and the dipper 32 is in proper position to begin its forward stroke, and sprocket 55 (or crank arm 43) is about to begin its forward stroke, as is also the sprocket wheel 62. The crank 43 is connected to the cross head by means of a connecting rod 42 and the cross head is connected to the dipper by means of a connecting rod 39. The transfer pan 34 moves upon the pivot or shaft 33, while the dipper 32 moves upon its pivots 31. In Figure 3, the dipper 32 has nearly reached the limit of its forward stroke and has begun to raise and the slide 30 has already moved slightly rearward. In Figure 4 the dipper 32 has been elevated and in rising has rotated the gear segments 35, which are secured to shafts 31 and 33 and simultaneously move the dipper and pan. This has caused the pan 34 to move downward into position to receive the material from the dipper.

In Figure 5 the shovel has nearly reached the limit of its return stroke after having deposited the material in the transfer pan 34. To add to the enlargement of the segments 35 when the dipper 32 begins to descend, the pan 34 will be elevated and as shown in Figure 6 the pan 34 has nearly reached its dumping position.

The desired action is imparted to the dipper, pan and shovel by the relative positions of the crank arms and their connections with the sprockets 62 and 55. When the pan 34 is quickly elevated to dump the material upon the conveyor, the connection between the arm 47 and the sprocket 62 is approaching dead center and it can travel approximately forty or fifty degrees with less than two inches of backward motion to the head 30. The crank arm 43 is in such position that a movement of six inches, will move the cross head 38 about the same amount.

On the forward stroke of the shovel, the same principle causes the arm 47 on the sprocket 62 to move forward in a horizontal direction faster than the crank arm of the sprocket 55. This movement however, does not affect the cross head 30, or it would drop the dipper 32 too great a distance at its forward end. This is accomplished by the slot connection in the arm 47 with the pin of the sprocket 62. At this point, the dog 50 operates at the proper time to move the cross head 30 forward, if necessary and in the event the dipper strikes a raised bottom or a hard material, this dog keeps the cross head and dipper in proper position until the lug 54 releases the dog from the ratchet.

Mounted within the boom upon sprocket wheels 65 and 66, is an endless conveyor 67, being rocked in position to receive the contents of the transfer pan 34 when the latter is dumped. The opposite or rear end of this conveyor is positioned above an endless conveyor 68, one end being adapted to receive the load and to transfer the same to the cars or carts for hauling. The conveyor 67 is driven by means of a chain 69, which passes over sprockets 71 and 72, the latter being mounted upon shafts passing transversely through the conveyor. The conveyor 68 is driven through the medium of a chain 73, which operates over sprockets 74 and 75, the former being mounted upon the shaft 14 and the latter upon a short shaft 76, journaled in the rear end of the truck 10. A sprocket 77 is mounted upon an arm 78 of the conveyor 68, this sprocket being driven through beveled gearing 79. The sprocket 77 is driven from a suitable source of power and through the gearing 79 operates the sprocket 73 and chain 75 to operate the conveyor, while the machine is moved along the rails 12 through the gearing connection with the shaft 14. The shaft 14 has also mounted upon its lower end a beveled gear 82, which drives the beveled gear 83 loosely mounted upon a shaft 84 journaled in bearings beneath the truck frame. The beveled gear 83 is locked upon the shaft 84 through the medium of a clutch 85. Each end of the shaft 84 is connected to the traction wheels 11 through the medium of a gear 86, so as to provide for controlling the movement of the truck over the rails 12.

To provide for rotating the turn-table 15, the forward edge of this table is provided with a rack 87, which is engaged by a pinion 88, the latter being mounted upon a shaft 89, suitably journaled in the frame of the truck 10. Also mounted upon the shaft 89, is a beveled gear 90, which is driven from a beveled gear 91, journaled in a short horizontally disposed shaft which carries at its other end a beveled gear 92. The last mentioned gear is alternately engaged by pinions 93, which are slidably mounted upon a shaft 94 and are controlled by clutches 95, through which the direction of rotation of the turn-table may be governed. The shaft 94 receives its motion from the drive shaft 58, through the medium of a chain 96, operating over sprockets 97, mounted respectively upon the shafts 94 and 58, a clutch 99 serving to control the movement of the shaft 94. A clutch 100 also serves to control the movement of the sprockets 57 and 64, which operate the sprockets 55 and 62. The clutches 99 and 100 serve to lock upon the shaft 58, beveled pinions 101, which are driven by means of a pinion 102 fast upon the upper end of the shaft 14.

If desired, the outer end of the boom may be supported upon a truck 103, to facilitate movement of the machine.

It is believed that when the foregoing description is read in connection with the accompanying drawings, the construction and operation of the machine will be apparent, so that it is not thought necessary to give a further detail explanation. When the forward limit of the stroke has been reached the dog 50 will be disengaged through the medium of the lugs 54 so that upon a return stroke, the dipper and pan will be raised and lowered, due to the connection of the arms 45 with the arms 48. The slotted link connection between the arms 45 and arms 48 serve to prevent any movement being imparted to the cross head 30 through the said arms upon the forward stroke.

The invention is susceptible of various changes in its form, proportions and minor details of construction, and the right is herein reserved to make such changes as properly fall within the scope of the appended claims.

Having described the invention, what is claimed is:

1. A shovel comprising a support, a boom mounted for rotation thereon, a dipper mounted for pivotal movement upon the free end of the boom, a transfer pan also pivotally mounted upon the boom adjacent the dipper and adapted to receive the contents of the latter, mechanism for operating the dipper, a conveyor for receiving the contents of the transfer pan and mechanism for operating the pan to transfer the contents of the latter to the conveyor.

2. A shovel comprising a support, a boom mounted for rotation thereon, a dipper mounted for pivotal and horizontal movement upon the boom, a transfer pan also mounted upon the boom for pivotal and horizontal movement and adapted to receive the contents of the dipper, a conveyor for receiving the contents of the pan and means whereby the dipper and pan are pivotally moved to discharge their contents during horizontal movement in one direction and for locking the same against pivotal movement when traveling in an opposite direction.

3. A shovel comprising a support, a boom mounted for rotation thereon, means for rotating the boom, a dipper mounted for pivotal and sliding movement upon the boom, a transfer pan also mounted for pivotal and sliding movement upon the boom adjacent the dipper and adapted to receive the contents of the latter, a conveyor positioned to receive the contents of the transfer pan, means for moving the dipper and pan forward to receive a load, means for locking said dipper and pan against said pivotal movement during the forward movement of the same, means for automatically releasing the locking means when the limit of forward movement has been reached, means for moving the dipper and pan inward and means for locking the dipper and pan upon their pivots to dump the load from the dipper to the pan and from the pan upon the conveyor during the return stroke.

4. A shovel comprising a support, a boom mounted for rotation thereon, means for rotating the boom, a dipper mounted for pivotal and sliding movement upon the boom, a transfer pan also mounted for pivotal and sliding movement upon the boom adjacent the dipper and adapted to receive the contents of the latter, a conveyor positioned to receive the contents of the transfer pan, means for moving the dipper and pan forward to receive a load, means for locking the said dipper and pan against pivotal movement during the forward movement of the same, means for automatically releasing the locking means when the limit of forward movement has been reached, means for moving the dipper and pan inward, means for rocking the said dipper and pan upon their pivots to dump their load from the dipper to the pan and from the pan upon the conveyor during the return stroke, a movable gate for the rear end of the dipper and means for operating the gate.

5. A shovel comprising a support, a boom mounted for rotation thereon, means for rotating the boom, a dipper mounted for pivotal and sliding movement upon the boom, a transfer pan also mounted for pivotal and sliding movement upon the boom adjacent the dipper and adapted to receive the contents of the latter, a conveyor positioned to receive the contents of the transfer pan, means including a horizotally movable cross head for moving the dipper forward to receive a load, means for locking said dipper and pan against pivotal movement during the forward movement of the same, means for automatically releasing the locking means when the limit of forward movement has been reached, means for moving the dipper and pan inward and means for rocking the said dipper and pan upon their pivots to dump the load from the dipper to the pan and from the pan upon the conveyor during the return stroke.

6. A shovel comprising a support, a boom mounted for rotation thereon, means for rotating the boom, a dipper mounted for pivotal and sliding movement upon the boom, a transfer pan also mounted for pivotal and sliding movement upon the boom adjacent the dipper and adapted to receive the contents of the latter, a conveyor positioned to receive the contents of the transfer pan, means including a horizontally movable cross head for moving the dipper to receive a load, a horizontally movable slide operating parallel to and independently of the cross head, interlocking means between the cross head and slide for locking the dipper and pan against pivotal movement during the forward movement of the same, means for automatically releasing the locking means when the limit of forward movement has been reached, means for moving the dipper and pan inward and means for rocking the dipper and pan upon their pivots to dump the load from the dipper to the pan and from the pan upon the conveyor during the return stroke.

7. A shovel comprising a support, a boom mounted for rotation thereon, means for rotating the boom, a dipper mounted for pivotal and sliding movement upon the boom, a transfer pan also mounted for pivotal and sliding movement upon the boom adjacent the dipper and adapted to receive the contents of the latter, a conveyor positioned to receive the contents of the transfer pan, means including a horizontally movable cross head for moving the dipper and pan forward to receive a load, a pivoted dog carried by the slide and engageable with the cross head to lock the dipper and pan against pivotal movement during the forward movement of the same, means for automatically releasing the locking means when the limit of forward movement has been reached, means for moving the dipper and pan inward and means for rocking the said dipper and pan upon their pivots to dump the load from the dipper to the pan and from the pan upon the conveyor during the return stroke.

8. A shovel comprising a support, a boom mounted for rotation thereon, means for rotating the boom, a dipper mounted for pivotal and sliding movement upon the boom, a transfer pan also mounted for pivotal and sliding movement upon the boom adjacent the dipper and adapted to receive the contents of the latter, a conveyor positioned to receive the contents of the transfer pan, means including a horizontally movable cross head for moving the dipper and pan forward to receive a load, a pivoted dog carried by the slide and engageable with the cross head to lock the dipper and pan against pivotal movement during the forward movement of the same, means located in the path of movement of the dog at the end of the forward stroke for automatically releasing the locking means, means for moving the dipper and pan inward and means for rocking the said dipper and pan upon their pivots to dump the load from the dipper to the pan and from the pan upon the conveyor during the return stroke.

9. A shovel comprising a support, a boom mounted for rotation thereon, means for rotating the boom, a dipper mounted for pivotal and sliding movement upon the boom, a transfer pan also mounted for pivotal and sliding movement upon the boom adjacent the dipper and adapted to receive the contents of the latter, a conveyor positioned to receive the contents of the transfer pan, means for moving the dipper and pan forward to receive a load, means for locking the dipper and pan against pivotal movement during the forward movement of the same, means for automatically releasing the locking means when the limit of forward movement has been reached, means for moving the dipper and pan inward and means including intermeshing gears operated upon the return stroke of the dipper and pan to rock the same upon their pivots and dump the load from the dipper to the pan and from the pan upon the conveyor.

10. A shovel comprising a support, a boom mounted for rotation thereon, means for rotating the boom, a dipper mounted for pivotal and sliding movement upon the boom, a transfer pan also mounted for pivotal and sliding movement upon the boom adjacent the dipper and adapted to receive the contents of the latter, a conveyor positioned to receive the contents of the transfer pan, means including a horizontally movable cross head for moving the dipper forward to receive a load, a horizontally movable slide operating parallel to and independently of the cross head, interlocking means between the cross head and slide for locking the dipper and pan against pivotal movement during the forward movement of the same, means for automatically releasing the locking means when the limit of forward movement has been reached, means for moving the dipper and pan inward and means including a link pivotally connecting the slide and dipper for rocking the dipper and pan upon their pivots to dump the load from the dipper to the pan and from the pan upon the conveyor during the return stroke.

11. A shovel comprising a movable support, a turntable mounted thereon, a motor mounted upon the turn-table, a pivoted boom carried by the turn-table and capable of vertical swinging movement, a cross head mounted for sliding movement upon the outer end of the boom, a dipper pivotally mounted upon the cross head, a transfer pan also pivotally mounted upon said cross head, means operated by the motor for moving the cross head longitudinally of the boom, means also operated by the motor for swinging the dipper upon its pivot during the forward movement of the cross head, means connecting the dipper and transfer pan for moving the latter upon its pivot in a direction opposite the movement of the dipper, means for automatically locking the dipper and pan against pivotal movement and means for automatically releasing the same.

12. A shovel comprising a support, a boom mounted for rotation thereon, a dipper mounted for pivotal movement upon the free end of the boom, a transfer pan also pivotally mounted upon the boom adjacent the dipper and adapted to receive the contents of the latter, mechanism for operating the dipper, a conveyor for receiving the contents of the transfer pan, mechanism for operating the pan to transfer the contents of the latter to the conveyor and a truck mounted beneath the outer end of the boom.

In testimony whereof I affix my signature.

JOHN P. WALTER.